United States Patent
Shao et al.

(10) Patent No.: US 7,467,769 B2
(45) Date of Patent: Dec. 23, 2008

(54) ELEVATING MECHANISM

(75) Inventors: Chun-How Shao, Chu-Nan (TW); Wen-Chi Fu, Chu-Nan (TW); Tai-Li Chang, Chu-Nan (TW)

(73) Assignee: Coretronic Corporation, Miao-Li County (TW)

( * ) Notice: Subject to any disclaimer, the term of this patent is extended or adjusted under 35 U.S.C. 154(b) by 227 days.

(21) Appl. No.: 11/349,432

(22) Filed: Feb. 6, 2006

(65) Prior Publication Data

US 2006/0202095 A1   Sep. 14, 2006

(30) Foreign Application Priority Data

Mar. 9, 2005   (TW) ............................... 94107084 A

(51) Int. Cl.
*G03B 21/14* (2006.01)
*F16M 11/24* (2006.01)
(52) U.S. Cl. ................. 248/188.2; 248/677; 353/70; 353/119
(58) Field of Classification Search ............... 248/188.2, 248/157, 188.4, 188.8, 677; 353/70, 119
See application file for complete search history.

(56) References Cited

U.S. PATENT DOCUMENTS

| | | | |
|---|---|---|---|
| 6,302,543 B1 * | 10/2001 | Arai et al. ................... 353/70 |
| 6,685,149 B1 * | 2/2004 | Chang ..................... 248/188.2 |
| 6,715,890 B2 * | 4/2004 | Huang et al. ................ 353/119 |
| 6,789,904 B2 * | 9/2004 | Chang ........................ 353/119 |
| 6,793,348 B2 * | 9/2004 | Lee et al. ..................... 353/119 |
| 6,796,538 B2 * | 9/2004 | Hsu et al. ................ 248/188.2 |
| 6,871,826 B2 * | 3/2005 | Oyama et al. ............ 248/188.8 |
| 6,923,417 B2 * | 8/2005 | Chang ........................ 248/649 |
| 7,111,948 B2 * | 9/2006 | Lee et al. ..................... 353/119 |
| 7,234,676 B2 * | 6/2007 | Chen et al. .................. 248/677 |
| 2002/0140909 A1 * | 10/2002 | Tanaka ........................ 353/70 |

* cited by examiner

*Primary Examiner*—Anita M King
(74) *Attorney, Agent, or Firm*—J.C. Patents

(57) ABSTRACT

An elevating mechanism for a projection apparatus includes a base, a movable leg, an elastomer, a decelerating module and a fixing component. The base is connected with the projection apparatus and has a slide, an accommodating space and an opening disposed at one end of the base. The accommodating space is located inside the base and communicated with the opening. The slide is in a sidewall of the base and communicated with the accommodating space. The movable leg is disposed through the opening and the accommodating space, and one end of the elastomer is disposed on the base. The movable leg is suitable for protruding from the opening of the base by the elastomer. Moreover, the decelerating module is disposed on the movable leg and is in the slide. The decelerating module is suitable for contacting with the base. The fixing component is suitable for fixing the movable leg.

17 Claims, 8 Drawing Sheets

ELEVATING MECHANISM

CROSS-REFERENCE TO RELATED APPLICATION

This application claims the priority benefit of Taiwan application serial no. 94107084, filed on Mar. 9, 2005. All disclosure of the Taiwan application is incorporated herein by reference.

BACKGROUND OF THE INVENTION

1. Field of Invention

The present invention relates to an elevating mechanism, more particularly to an elevating mechanism for a projection apparatus.

2. Description of Related Art

FIG. 1 is a projection schematic view of a conventional projection apparatus 50. Referring to FIG. 1, in general, in order to adjust a position of an image from the projection apparatus 50, designers commonly add an elevating mechanism 100 in the projection apparatus 50. The image can be at a proper position on a screen 80 by adjusting a projection angle θ of the projection apparatus 50 via the elevating mechanism 100 for changing a height of the image projected from the projection apparatus 50.

FIG. 2 is an exploded view of the conventional elevating mechanism. Referring to FIG. 2, the conventional elevating mechanism 100 mainly includes a base 110, a movable leg 120, a spring 130, a fixing component 140 and a pad 150. The base 110 is connected with the projection apparatus 50 (as shown in FIG. 1). The movable leg 120 is located in the base 110, and the spring 130 is located between the base 110 and the movable leg 120. Moreover, the fixing component 140 has a positioning section (not shown in the figure), which is suitable for inserting into a positioning groove 122 of the movable leg 120 to fix the movable leg 120. In addition, the pad 150 is located on one end of the movable leg 120.

In the conventional elevating mechanism 100, when a user pushes a button 142 of the fixing component 140 to cause the positioning section of the fixing component 140 to disengage from the positioning groove 122 of the fixing component 140, the movable leg 120 is popped out from the base 110 by an elasticity of the spring 130. The movable leg 120 is fixed by the fixing component 140. Thus, the elevation angle θ of the projection apparatus 50 can be adjusted.

As mentioned above, the spring 130 will provide the elasticity to eject the movable leg 120 from the base 110 quickly, so that the movable leg 120 may impact the base 110 and create noise which is uncomforting to the user, and the elevating mechanism 100 may be likely damaged due to an impact of the movable leg 120 and the base 110. Moreover, it is not easy to control an extrusion length of the movable leg 120 because of a sudden ejecting speed of the movable leg 120, which results in the inconvenience for the user to adjust the projection angle θ. In addition, considering the assembling issue, when the movable leg 120 is ejected from the base 110, it may sway due to the big gap between the movable leg 120 and the base 110. Ultimately, a negative impression regarding a quality of the projection apparatus 50 may be stamped on a mind of the user.

SUMMARY OF THE INVENTION

Accordingly, the present invention is directed to provide an elevating mechanism with a movable leg protruded out from the base smoothly and steadily.

According to the aforementioned and other objects, the present invention provides the elevating mechanism for a projection apparatus. The elevating mechanism includes a base, the movable leg, a first elastomer, a decelerating module and a fixing component. The base is connected with the projection apparatus, and the base has a first slide, an accommodating space and a first opening. The first opening is located at one end of the base. The accommodating space is located inside the base and is communicated with the first opening. The first slide is in one sidewall of the base and is communicated with the accommodating space. Moreover, the movable leg is disposed through the first opening and the accommodating space, and one end of the first elastomer is disposed on the base. The movable leg is suitable for protruding from the first opening of the base by the first elastomer. Moreover, the decelerating module is disposed on the movable leg and is in the first slide. The decelerating module is suitable for contacting with the base, and the fixing component is suitable for fixing the movable leg.

The decelerating module is applied on the movable leg in the present invention. The decelerating module is suitable for contacting with the base to slow a protruding speed of the movable leg when the movable leg is protruding out from the opening of the base by the elastomer. Therefore, the invention improves a disadvantage of a noise resulting from an impacting of the movable leg with the base in the conventional projection apparatus, and furthermore, the elevating mechanism may not be damaged easily. Moreover, the user can easily control the protruding length of the movable leg so as to cause the image from the projection apparatus in a proper position on the screen.

In order to the make the aforementioned and other objects, features and advantages of the present invention comprehensible, a plurality of embodiments accompanied with figures is described in detail below.

DESCRIPTION OF EMBODIMENTS

The First Embodiment

Figure 1:
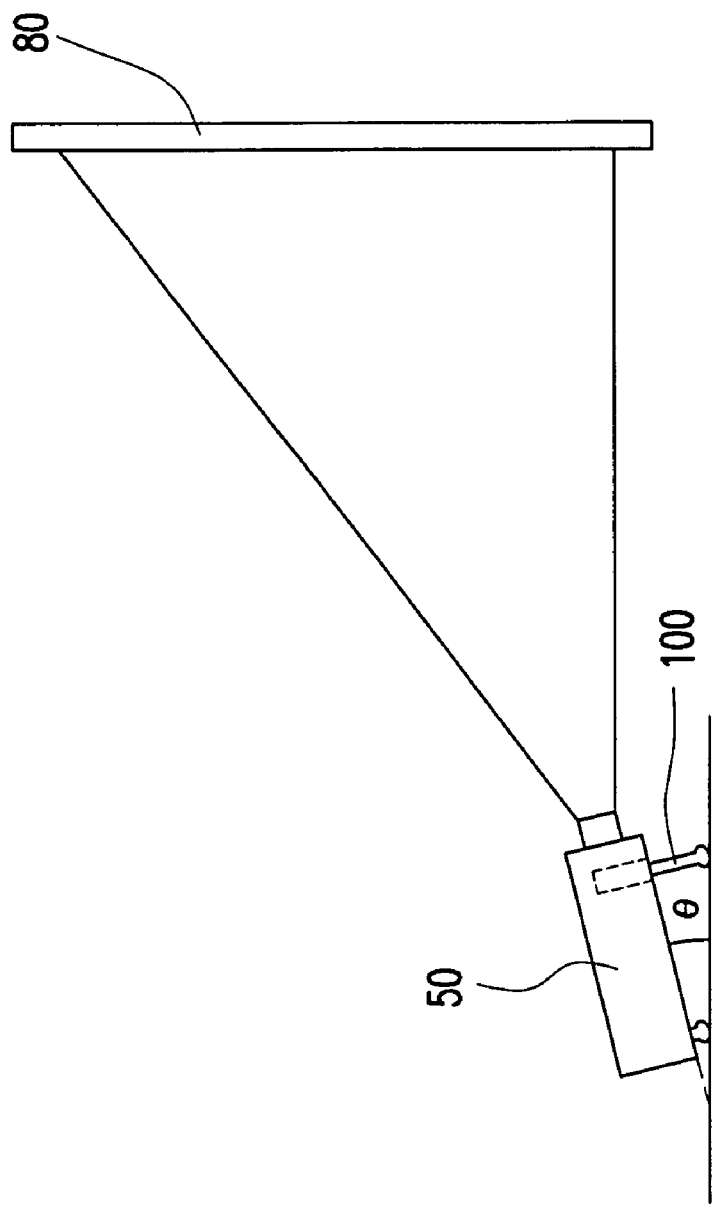
FIG. 1 is a projection schematic diagram of a conventional projection apparatus.
Figure 2:
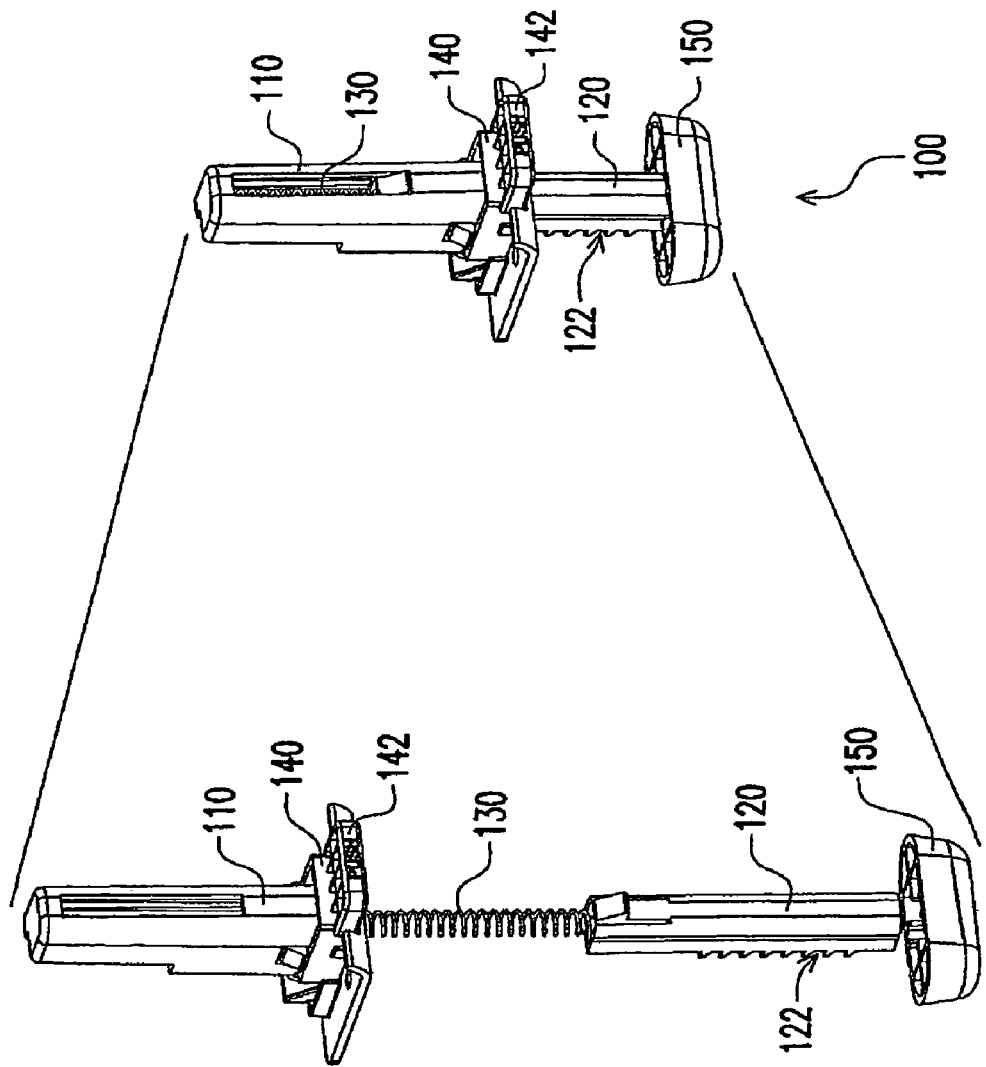
FIG. 2 is an exploding diagram of the conventional elevating mechanism.
Figure 3:
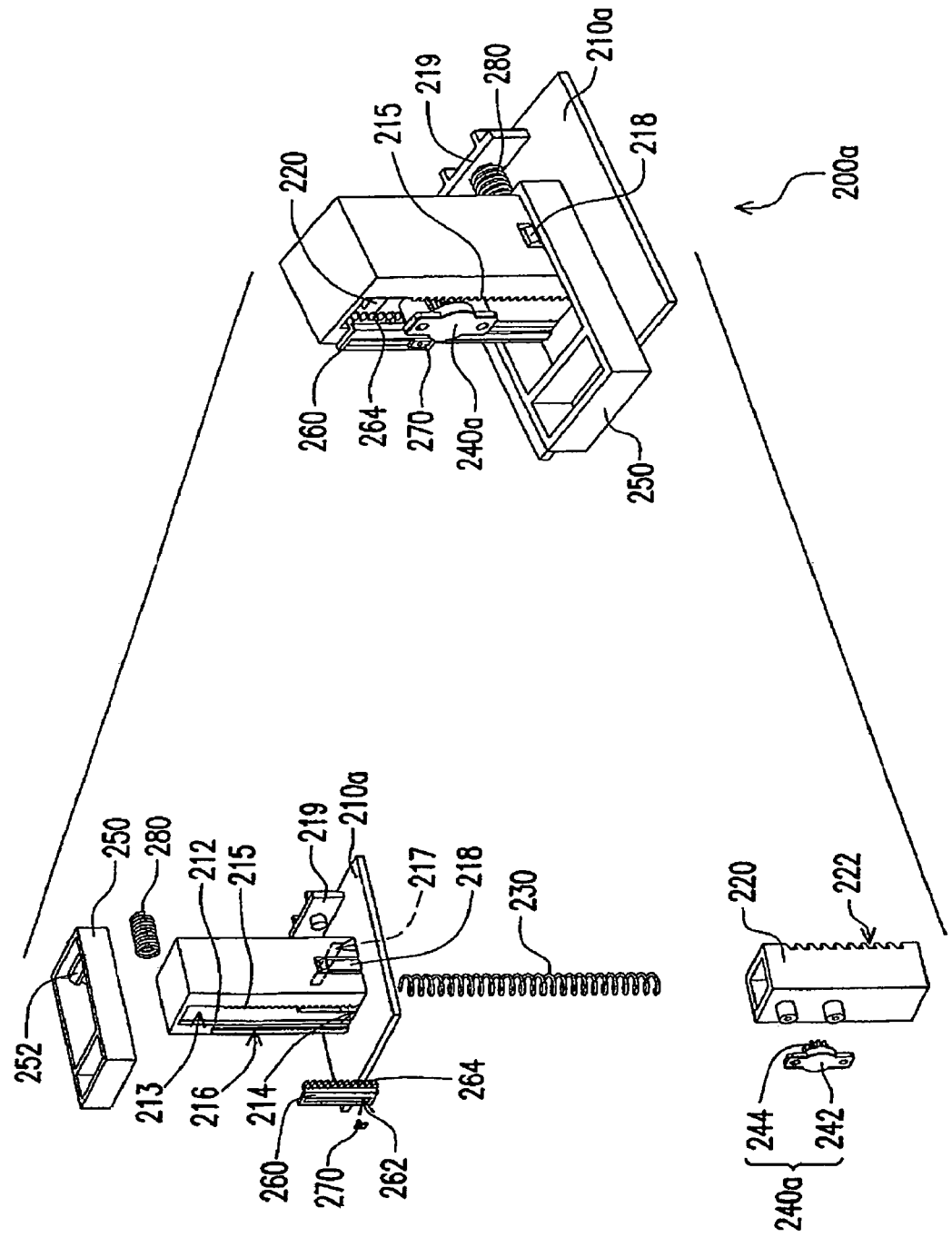
FIG. 3 is an exploding diagram of an elevating mechanism of the first embodiment according to the present invention.

Referring to FIG. 3, an elevating mechanism 200a in the first embodiment is suitable for a projection apparatus (not shown in the figure). The elevating mechanism 200a includes a base 210a, a movable leg 220, a first elastomer 230, a decelerating module 240a and a fixing component 250. The base 210a is connected with the projection apparatus, and the base 210a has a first slide 212, an accommodating space 213 and a first opening 214. The first opening 214 is located on one end of the base 210a, and the accommodating space 213 is located inside the base 210a and is communicated with the first opening 214. The first slide 212 is in one sidewall of the base 210a and is communicated with the accommodating space 213. Moreover, the movable leg 220 passes through the first opening 214 of the base 210a and the accommodating space 213, and one end of the first elastomer 230 is disposed on the base 210a. The movable leg 220 is suitable for protruding from the first opening 214 of the base 210a by the elastomer 230. Moreover, the decelerating module 240a is disposed on the movable leg 220 and is in the slide 212. The decelerating module 240a is suitable for contacting with the base 210a, and the fixing component 250 is suitable for fixing the movable leg 220.

In the above mentioned elevating mechanism 200a, another end of the elastomer 230, for example, is against the movable leg 220. Moreover, the base 210a, for example, includes a first rack 215 located at one side of the first slide 212. In addition, the decelerating module 240a, for example, includes a first housing 242 and a first damper 244. The first housing 242 is disposed on the movable leg 220 by a screwing manner, and the first damper 244 is located on the first housing 242 and engages with the first rack 215. The first damper 244 is suitable for pivoting along the first rack 215 on the base 210a, and the first damper 244 is, for example, a damping gear.

Figure 4:
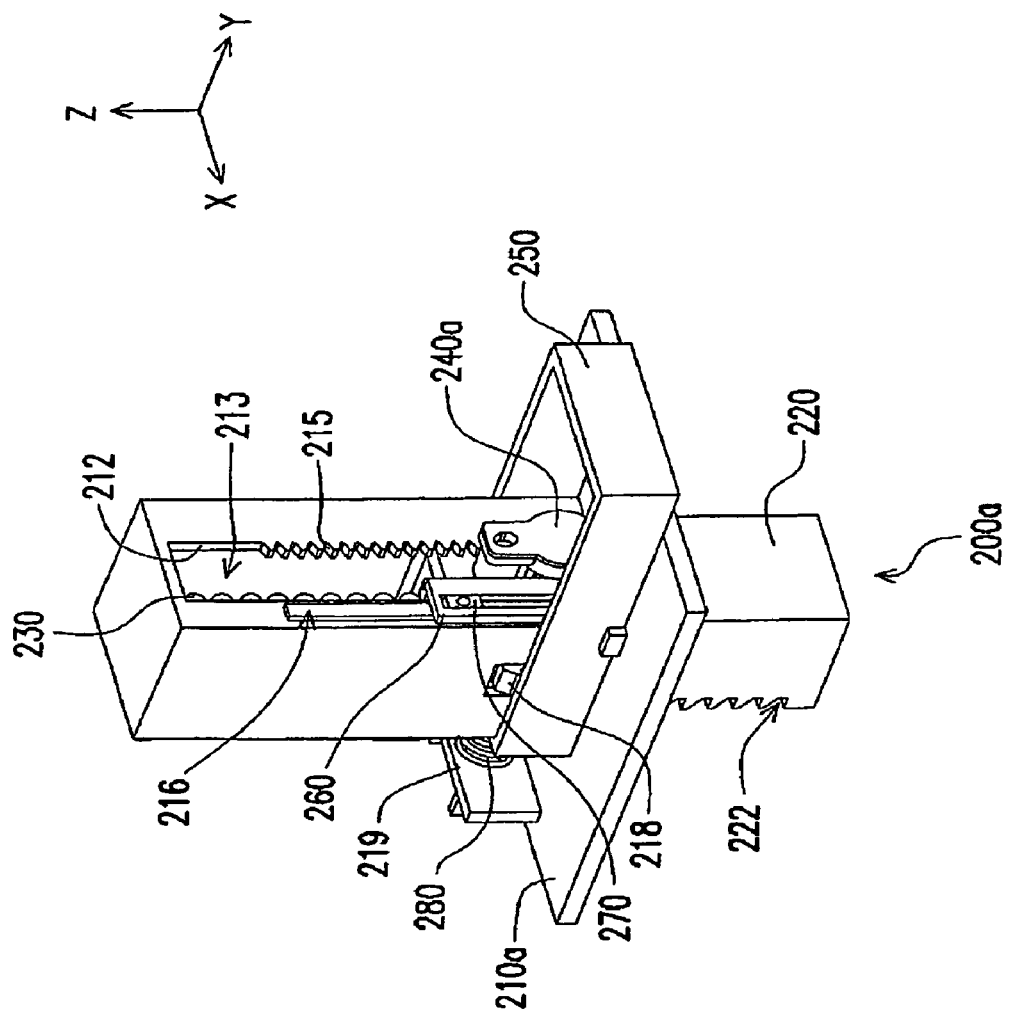
FIG. 4 is a structure schematic diagram of the elevating mechanism while the movable leg is protruding out in FIG. 3.

Referring to FIG. 3 and FIG. 4, the fixing component 250 of the first embodiment is suitable for contacting with the movable leg 220 to fix the movable leg 220. When a user pushes the fixing component 250 to release it from the movable leg 220, the movable leg 220 protrudes from the first opening 214 of the base 210a by an elasticity of the first elastomer 230. The first elastomer 230, for example, is a spring. Moreover, while the movable leg 220 is protruding out, the first damper 244 of the decelerating module 240a disposed on the movable leg 220 pivots along the first rack 215 on the base 210a, so as to slow a protruding speed of the movable leg 220. Moreover, when the movable leg 220 protrudes out to a proper position, the user can fix the movable leg 220 by the fixing component 250. Wherein, the method of fixing the movable leg 220 by the fixing component 250 is described in the following.

According to the above, in the elevating mechanism 200a of the first embodiment, the movable leg 220 protrudes out slowly in a steady speed from the base 210a without impacting the base 210a. Thus, it not only avoids the noise uncomforting to the user but also improves the disadvantage of the damage of the elevating mechanism resulting from an impact of the movable leg with the base. Moreover, as the movable leg 220 protrudes out in the steady speed from the base 210a, the user easily controls a protrusion length of the movable leg 220, so as to have the image from the projection apparatus to the proper position on the screen. In addition, a damping coefficient of the first damper 244 is easily adjusted, and therefore the movable leg 220 protrudes out from the base 210 in a proper speed by adjusting the damping coefficient. The whole elevating mechanism 200a achieves a delicate quality.

In the first embodiment according to the present invention, the elevating mechanism 200a further includes a slidable component 260, which is movably applied on the base 210a. More specifically, the base 210a, for example, has a second slide 216 disposed aside of the first slide 212. The slidable component 260, for example, has a third slide 262, and the elevating mechanism 200a, for example, further has a bolt 270 disposed between the second slide 216 and the third slide 262, so that the slidable component 260 is movably disposed on the base 210a. Moreover, the slidable component 260, for example, has a second rack 264, which is opposite to the first rack 215 and engages with the first damper 244. When the movable leg 220 protrudes out from the base 210a, the first damper 244 pivots along the first rack 215 and the second rack 264, and brings the slidable component 260 to move down.

As mentioned above, the first damper 244 pivots along the first rack 215 and the second rack 264 on the two sides of the first slide 212, so that the housing 242 of the decelerating module 240a does not sway when moving down. The movable leg 220 does not sway while protruding out because the housing 242 is fixed on the movable leg 220. As a result, the user feels the elevating mechanism 200a more delicate, and furthermore the whole projection apparatus more delicate.

The following illustrates the manner to fix the movable leg 220 by the fixing component 250. The movable leg 220 of the first embodiment, for example, has a plurality of positioning grooves 222, and the fixing component 250 is suitable for inserting into one of the positioning grooves 222 to fix the movable leg 220. The base 210a, for example, has a second opening 217, and the fixing component 250 is suitable for passing through the second opening 217 and inserting into one of the positioning grooves 222. More specifically, in the first embodiment, the fixing component 250, for example, is a frame and is located on the base 210a. The frame has a positioning section 252, which is suitable for passing through the second opening 217 and inserting into one proper positioning groove 222 to allow the movable leg 220 to protrude out for a proper length.

In the first embodiment, the base 210a, for example, has a plurality of fasteners 218 which is suitable for fastening the fixing component 250 to allow the fixing component 250 to move only along an axial direction. In other words, the fixing component 250 in FIG. 4 only moves along axis Y, and does not move along axis Z And axis X. Moreover, the elevating mechanism 200a of the first embodiment, for example, further includes a second elastomer 280, and the base 210a, for example, has a baffler 219, and the second elastomer 280 is disposed between the baffler 219 and the fixing component 250. The second elastomer 280, for example, is a spring.

In the above elevating mechanism 200a, when the user pushes the fixing component 250 to for the movable leg 220 to protrude, the second elastomer 280 is compressed. When the movable leg 220 protrudes out to the proper length, the user only needs to release the fixing component 250 to cause the fixing component 250 back to an original position by an elasticity of the elastomer 280 and then fix the movable leg 220.

Figure 5:
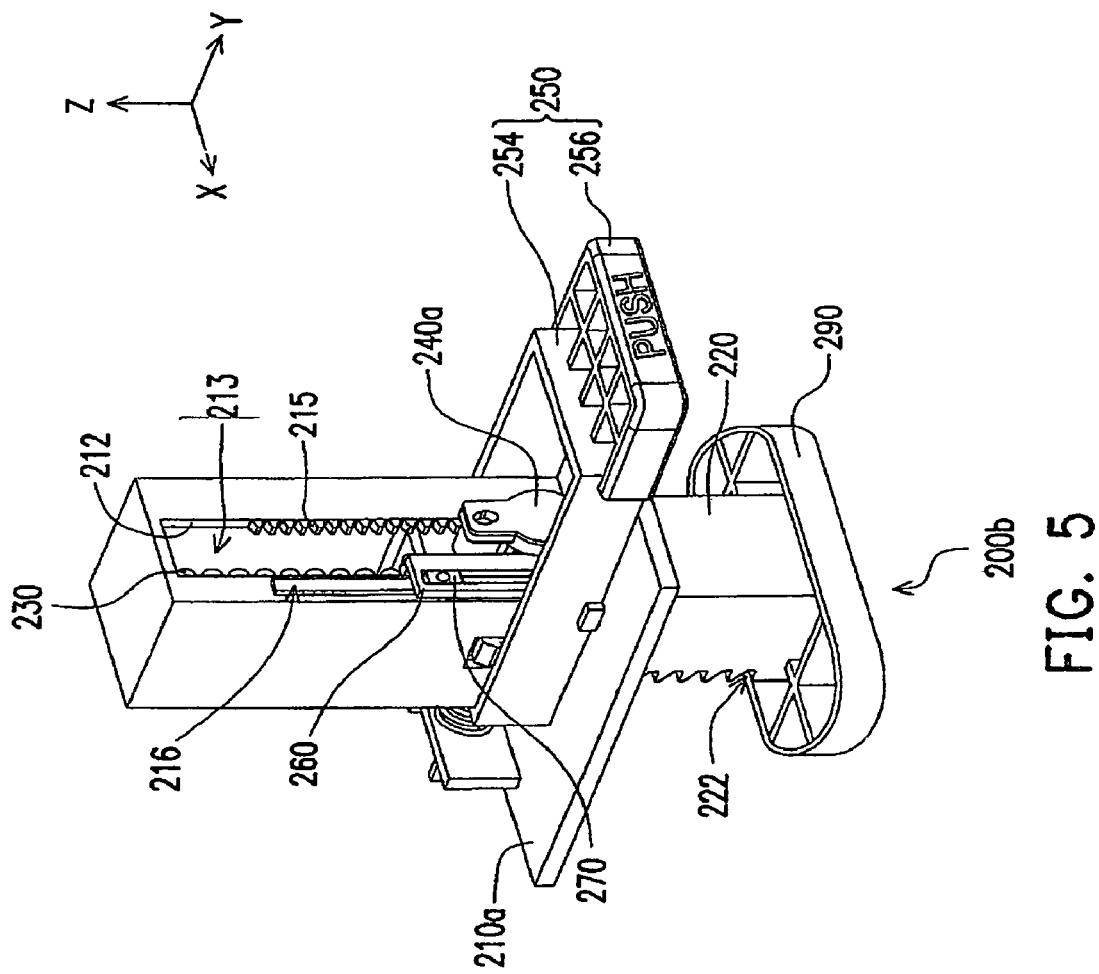
FIG. 5 is a perspective diagram of another elevating mechanism of the first embodiment according to the present invention.

Referring to FIG. 5, another elevating mechanism 200b of the first embodiment is similar to the elevating mechanism 200a shown in FIG. 4. The difference is in the elevating mechanism 200b. The fixing component 250, for example, has a frame 254 and a button 256, and the button 256 is disposed on the frame 254 to allow the user to push the fixing component 250 in convenience. Moreover, the elevating mechanism 200b, for example, further includes a pad 290 disposed on one end of the movable leg 220 to avoid the swaying of the projection apparatus (not shown in figure).

The Second Embodiment

Figure 6:
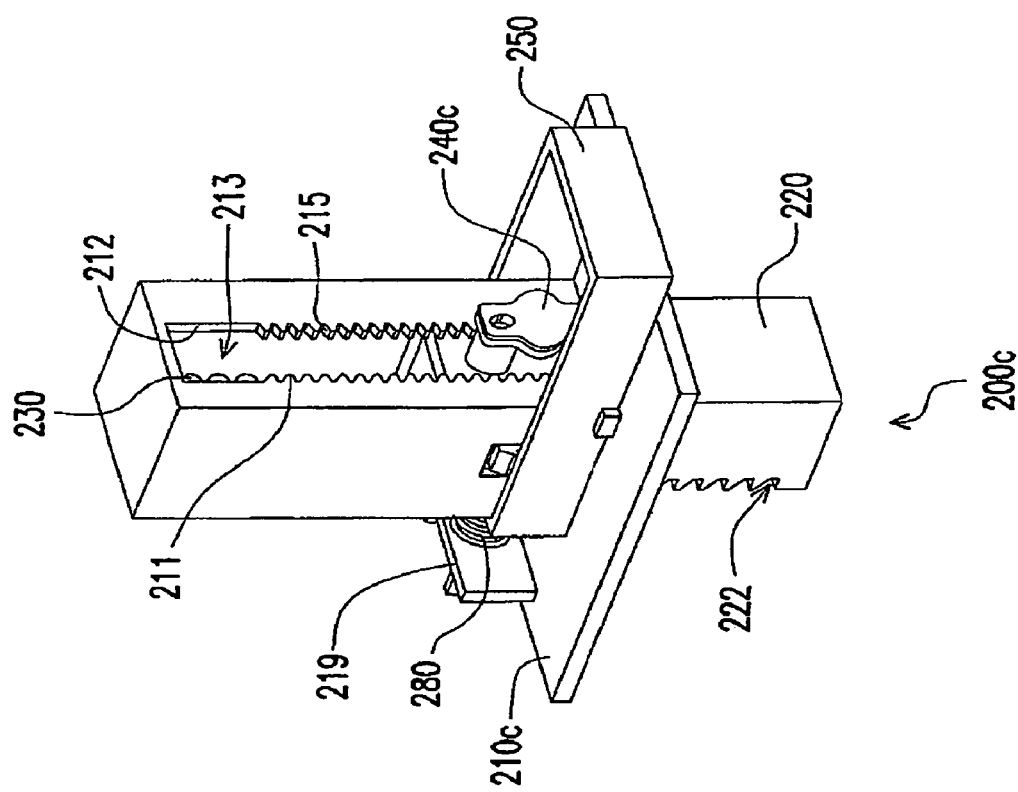
FIG. 6 is a perspective diagram of an elevating mechanism of the second embodiment according to the present invention.
Figure 7:
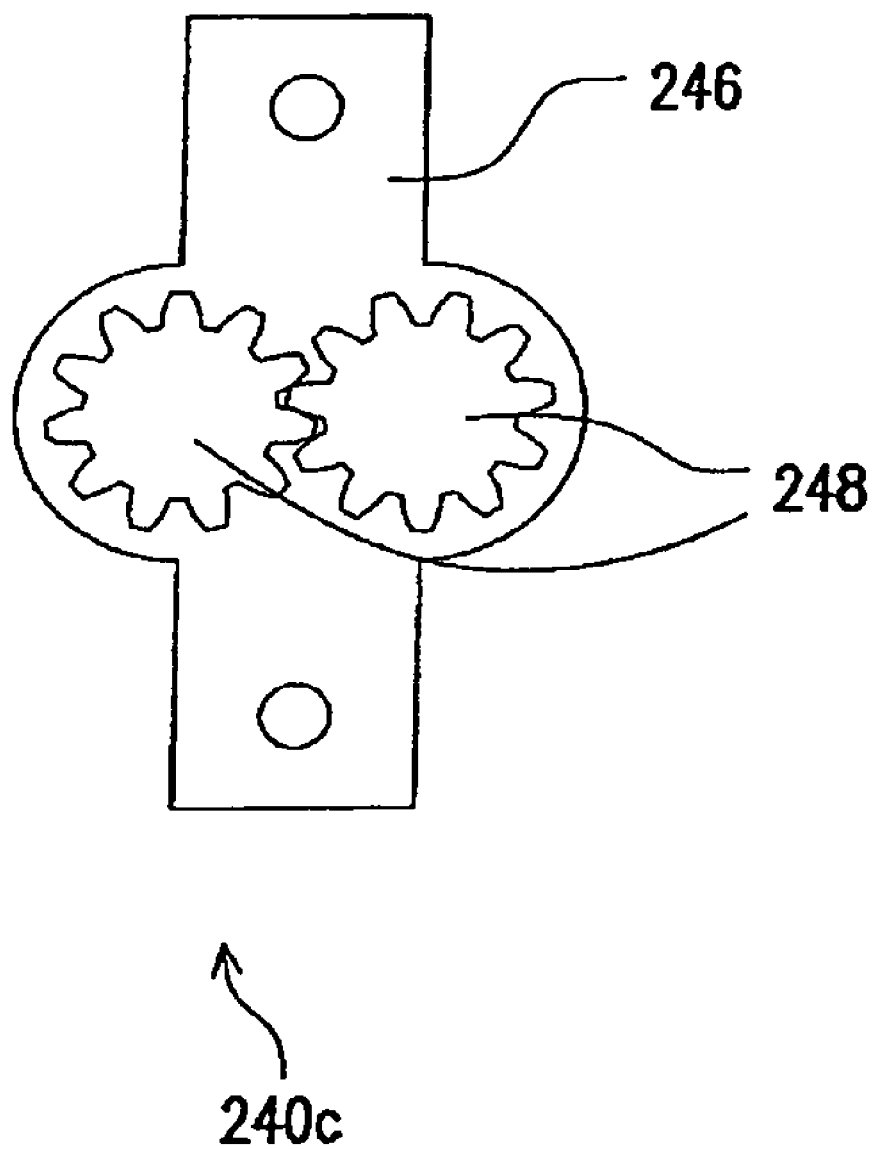
FIG. 7 is a structure schematic diagram of a decelerating module in FIG. 6.

Referring to FIG. 6 and FIG. 7, an elevating mechanism 200c of the second embodiment is similar to the elevating mechanism 200a (shown in FIG. 4). The difference is a manner used to avoid the swaying of the movable leg 220. More specifically, in the elevating mechanism 200c, a base 210c, for example, has a third rack 211 disposed on the other side of the first slide 212. Moreover, a decelerating module 240c, for example, includes a second housing 246 and a second damper 248. The second housing 246 is disposed on the movable leg 220, and the second damper 248 is disposed on the second housing 246 and engages with the first rack 215 and the third rack 211. The second damper 248 is suitable for pivoting along the first rack 215 and the third rack 211. Moreover, the second damper 248, for example, includes two adjacent damping gears, which are suitable for pivoting along one of the first rack 215 and the third rack 211.

In the above elevating mechanism 200c, the second damper 248 of the decelerating module 240c pivots along the first rack 215 and the third rack 211 on two sides of the first slide 212, so that the decelerating module 240c does not sway when moving down. The movable leg 220 does not sway during protruding because the housing 246 is fixed on the movable leg 220.

The Third Embodiment

Figure 8:
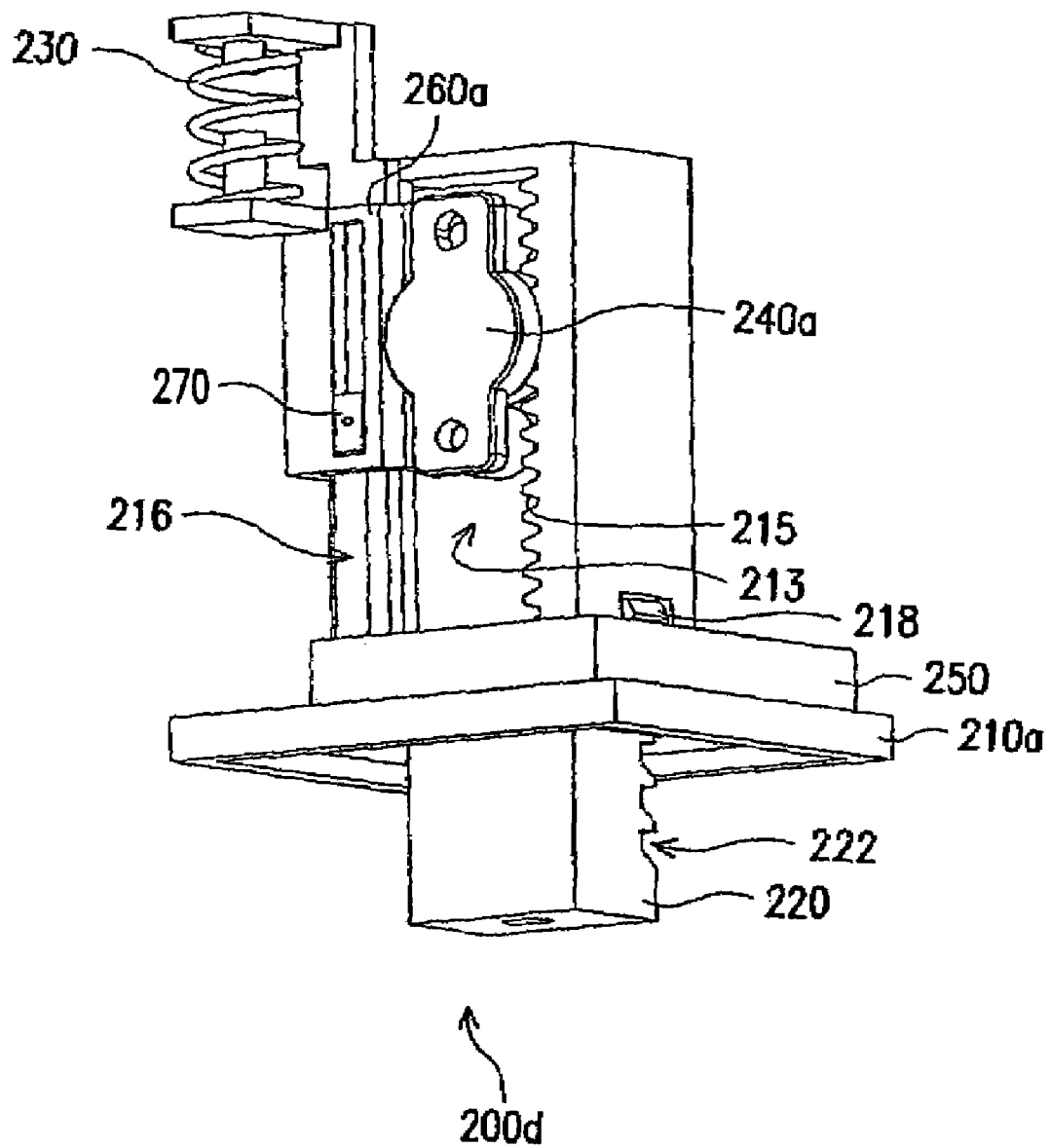
FIG. 8 is a perspective diagram of an elevating mechanism of the third embodiment according to the present invention.

Referring to FIG. 8, the difference of an elevating mechanism 200d of the third embodiment from the elevating mechanism 200a (shown in FIG. 4) is that the first elastomer 230 is disposed between the base 210a and the movable component 260a. In other words, for the elevating mechanism 200d of the third embodiment, the movable component 260a is pushed by the elasticity of the first elastomer 230, so as to bring the decelerating module 240a to move down, and to cause the movable leg 220 for protruding out steadily from the first opening 214 (referring to FIG. 3) without swaying.

Of course, in the elevating mechanisms 200c, 200d of the second and third embodiments, a pad 290 (as shown in FIG. 5) is disposed on one end of one of the movable legs 220, so as to avoid the swaying of the projection apparatus (not shown in drawings). Moreover, each fixing component 250 of the elevating mechanisms 200c, 200d is also composed of the frame 254 and the button 256 (as shown in FIG. 5).

In summary, the elevating mechanism 200a, 200b, 200c and 200d of the present invention have at least the following advantages:

1. The elevating mechanism 200a, 200b, 200c and 200d of the invention utilize the decelerating module 240a and 240c to slow the protruding speed of the movable leg 220 from the base 210a and 210c, which avoids the noise by the impacting. of the movable leg 220 with the base 210a and 210c so that the user has no uncomfortable feeling, and also avoids the damage of the elevating mechanism resulting from the impact of the movable leg 220 with the base 210a and 210c.

2. The movable leg 220 protrudes out slowly in the stable speed from the base 210a and 210c, the user can easily control the protruding length of the movable leg 220 to have the image from the projection apparatus at the proper position on the screen.

3. The movable leg 220 does not sway when protruding out form the base 210a and 210c because the damper 244 and 248 pivot along the racks 215, 264 and 211 on two sides of the first slide 212, therefore, the user may feel the elevating mechanism 200a, 200b, 200c and 200d more delicate, and furthermore, the whole projection apparatus more delicate.

It is apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An elevating mechanism suitable for use in a projection apparatus, comprising:
   a base connectable with the projection apparatus, the base having a first slide, an accommodating space and a first opening, wherein the first opening is located at an end of the base; the accommodating space is located inside the base and is communicated with the opening; the first slide is in a sidewall of the base and is communicated with the accommodating space;
   a movable leg disposed through the first opening and the accommodating space;
   a first elastomer having a first end disposed on the base, the movable leg being adapted for protruding out from the first opening of the base by the first elastomer;
   a decelerating module disposed on the movable leg and within the first slide, the decelerating module being adapted for contacting with the base; and
   a fixing component adapted for fixing the movable leg,
   wherein the base comprises a first rack located at one side of the first slide, and the decelerating module comprises a first housing located on the movable leg and a first damper located on the first housing, engaging with the first rack and adapted for pivoting along the first rack on the base.

2. The elevating mechanism as claimed in claim 1, wherein the first damper includes a damping gear.

3. The elevating mechanism as claimed in claim 1, further comprising a slidable component movably applied on the base.

4. The elevating mechanism as claimed in claim 3, wherein the slidable component has a second rack opposite to the first rack and engages with the first damper, wherein the first damper is adapted for pivoting along the first rack and the second rack.

5. The elevating mechanism as claimed in claim 4, further comprising a bolt, wherein the base has a second slide located aside of the first slide, and the slidable component has a third slide, wherein the bolt passes into the second slide and the third slide.

6. The elevating mechanism as claimed in claim 1, wherein the base has a third rack located at an opposite side of the slide.

7. The elevating mechanism as claimed in claim 6, wherein the decelerating module comprises:
   a second housing located on the movable leg; and
   a second damper located on the second housing and engaged with the first and the third racks, the second damper being adapted for pivoting along the first and third racks.

8. The elevating mechanism as claimed in claim 1, wherein the second damper comprises two adjacent damping gears adapted to pivot with one of the first and third racks.

9. The elevating mechanism as claimed in claim 1, wherein the movable leg comprises a plurality of positioning grooves, and the fixing component is adapted for inserting into one of the positioning grooves.

10. The elevating mechanism as claimed in claim 9, wherein the base has a second opening, and the fixing component is adapted for passing through the second opening and inserting into one of the positioning grooves.

11. The elevating mechanism as claimed in claim 10, wherein the fixing component comprises a frame located on the base, wherein the frame has a positioning section adapted for passing through the second opening and inserting into one of the positioning grooves.

12. The elevating mechanism as claimed in claim 11, wherein the fixing component further comprises a button located on the frame.

13. The elevating mechanism as claimed in claim 1, wherein the base comprises a plurality of fasteners adapted for fastening the fixing component, the fixing component moving along one single axial direction.

14. The elevating mechanism as claimed in claim 1, further comprising a second elastomer, wherein the base comprises a baffler, and the second elastomer is disposed between the baffler and the fixing component.

15. The elevating mechanism as claimed in claim 1, further comprising a pad disposed on an end of the movable leg.

16. The elevating mechanism as claimed in claim 1, further comprising a slidable component movably disposed on the base, wherein a second end of the first elastomer is against the slidable component, and the first elastomer is adapted for carrying the slidable component, and the slidable component uses the decelerating module to cause the movable leg to protrude from the first opening of the base.

17. The elevating mechanism as claimed in claim 1, wherein a second end of the first elastomer is against the movable leg.

* * * * *